United States Patent
Hanson

[15] 3,670,928
[45] June 20, 1972

[54] POWDER METERING DEVICE FOR LOADING AMMUNITION

[72] Inventor: Roy R. Hanson, 155 Cumberland Drive, Maryland Heights, Mo. 63043

[22] Filed: Jan. 26, 1970

[21] Appl. No.: 5,620

[52] U.S. Cl. .................................................. 222/288, 222/308
[51] Int. Cl. ..................................................... G01f 11/06
[58] Field of Search .............................. 222/365, 308, 288

[56] References Cited

UNITED STATES PATENTS

| | | | |
|---|---|---|---|
| 3,351,245 | 11/1967 | Johnson | 222/308 |
| 2,282,110 | 5/1942 | Angell | 222/308 |
| 2,081,544 | 5/1937 | Krivig | 222/308 X |
| 2,550,827 | 5/1951 | Lachmiller | 222/308 |
| 3,446,403 | 5/1969 | Serio | 222/158 |

Primary Examiner—Stanley H. Tollberg
Attorney—John D. Pope, III

[57] ABSTRACT

A powder metering device includes a powder reservoir, a pouring conduit below the reservoir and an elongated cylindrical channel between the reservoir and the pouring conduit. Inlet and outlet openings provide communication into the channel from the reservoir and the pouring conduit, respectively. A cylindrical slide having a reduced diameter portion intermediate its length is slidably mounted in the channel. The reduced diameter portion provides a metering chamber for receiving powder from the inlet conduit and for emptying the powder out of the outlet conduit. The opposite ends of the metering chamber are movable toward and away from one another so as to vary the size of the metering chamber.

Grooves on the slide prevent shearing off of powder particles as the slide moves past the inlet opening. Emptying means on the powder reservoir permit the removal of unused powder without the necessity of inverting the metering device.

28 Claims, 8 Drawing Figures

INVENTOR
ROY R. HANSON
BY
ATTORNEY

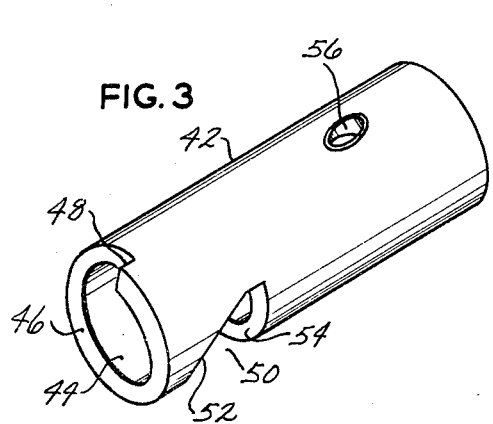
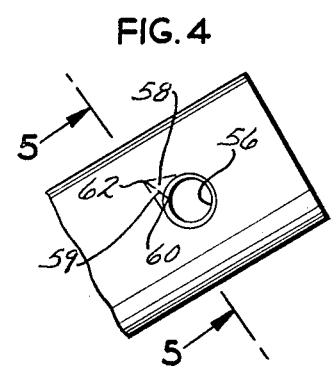
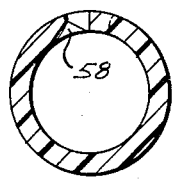
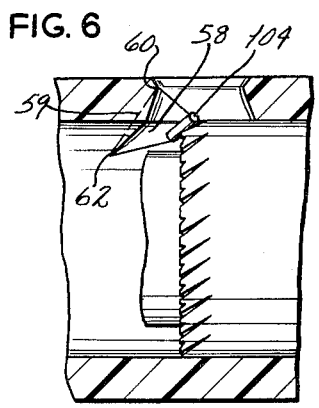
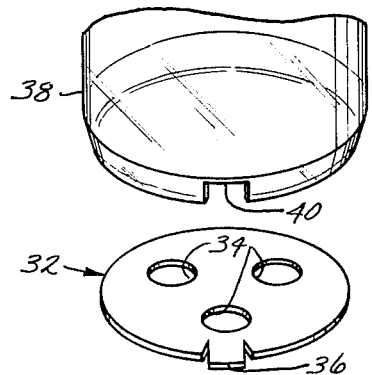
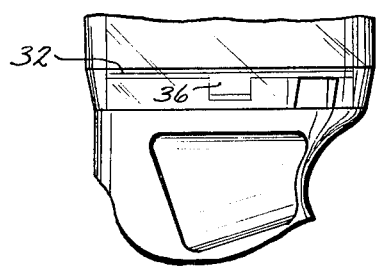

POWDER METERING DEVICE FOR LOADING AMMUNITION

This invention relates to ammunition loading equipment and more specifically to a powder metering device.

Many conventional powder metering devices include a slide having a metering chamber therein. The slide reciprocates to move the metering chamber from a filling position below an aperture in a powder reservoir to an emptying position wherein the metering chamber empties the powder into a drop tube. The metering chambers of conventional devices are not adjustable in size, and therefore can only be used to measure powder for one type of shell. With many of these devices the slide shears off powder grains as it passes beneath the inlet aperture. Gunpowder granules are manufactured in many different shapes. For example, some granules are spherical while others are shaped like cylindrical rods. Others are shaped like flat scales. Each shape of powder granule has its own ignition characteristic. Shearing or misshaping the granules during the loading process is therefore undesirable because it affects the consistency with which shells fire. Furthermore this shearing action causes abrasion and wearing of the material from which the slide is constructed. The slide must therefore be extremely hard in order to withstand the wear caused by the shearing of the powder granules. Softer and less expensive materials such as plastic have heretofore proved unsatisfactory.

Another disadvantage of present metering devices is that as the depth of the powder in the reservoir decreases, the pressure with which the powder is packed into the metering chamber decreases accordingly. Thus the metering chamber is filled more compactly when the reservoir is full than it is when the reservoir is nearly empty. Such variance in the compactness with which the powder is packed causes variance in the trajectory of the bullet or shot pellets being fired from the loaded shell.

An additional inconvenience of previous metering devices is the absence of means for emptying the unused powder from the reservoir without inverting the entire metering device.

This invention utilizes a slide having two spaced apart spools which form a metering chamber therebetween. They are threadably mounted on a rod so that they may be moved toward and away from one another to provide accurate adjustment of the volume of the metering chamber. The inlet opening leading from the powder reservoir is uniquely shaped so as to minimize the shearing of powder particles as the slide reciprocates back and forth. Furthermore, V-shaped grooves are provided on the slide so that rotation of the slide as it passes by the inlet opening minimizes the shearing of powder particles. The pressure in the powder metering device of this invention remains substantially constant regardless of the depth of the powder within the reservoir. This result is obtained by placing a plate in the lower end of the reservoir. The plate has a plurality of apertures therein to permit the powder to sift evenly down into the metering chamber of the slide. A novel spout is also provided on the reservoir for permitting the removal of the powder while the powder metering device is in its upright position.

Among the several objects of the present invention may be noted the provision of a powder metering device which can be adjusted to measure exact amounts of powder for many types of rifle, pistol and shotgun ammunition; the provision of a powder metering device which minimizes the shearing of powder particles; the provision of a powder metering device which insures consistent packing of the metering chamber each time it is filled with powder; the provision of a powder metering device which can be adjusted with a high degree of accuracy; the provision of a powder metering device which minimizes the amount of scratching and wearing caused to the slide by the powder granules; the provision of a powder metering device which prevents varying pressure of the powder as its depth in the reservoir varies; the provision of a powder metering device wherein the slide may be constructed of a soft material such as plastic; and the provision of a powder metering device which is durable in use and economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a sectional view of the powder metering device;

FIG. 3 is a perspective view of the insert tube which fits within the inclined channel of the powder metering device;

FIG. 4 is a plan view of the inlet aperture in the insert tube;

FIG. 5 is a sectional view taken along line 5—5 of FIG. 4;

FIG. 6 is a partial sectional view illustrating the entry of a rod-shaped powder pellet into the metering chamber;

FIG. 7 is an exploded perspective view illustrating the manner in which the reservoir fits over the remainder of the powder metering device; and FIG. 8 is a partial elevational view illustrating the apertures for removing the powder from the powder metering device.

Corresponding reference characters indicate corresponding parts throughout the several views of the drawings.

Figure 1:
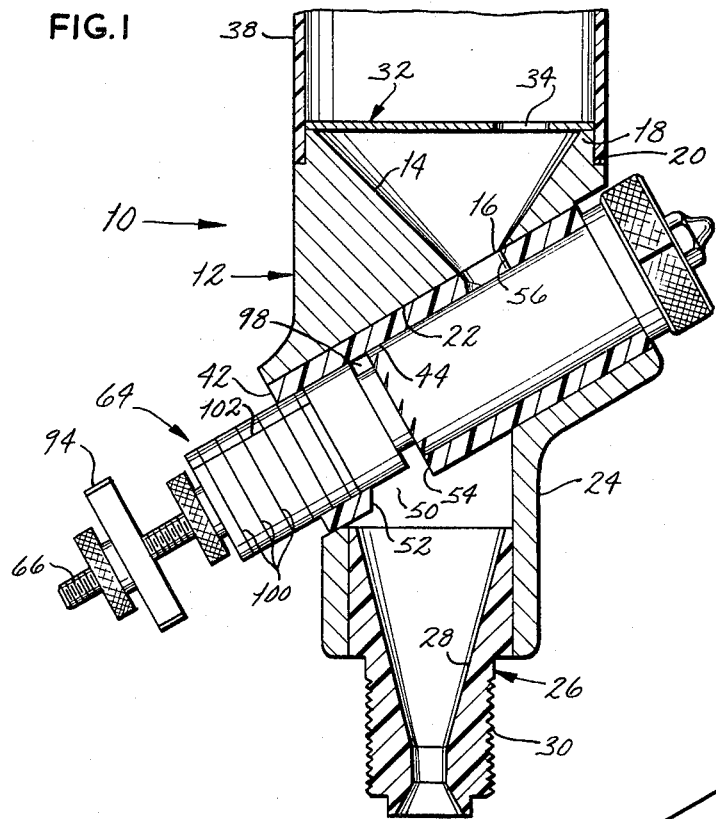

A powder metering device 10 includes a frame 12 which is constructed of wood, plastic, metal or any other desirable rigid material. At the upper end of frame 12 is a recessed funnel-like mouth 14 which terminates at its lower end in an aperture 16. Around the upper end of mouth 14 is an annular collar 18 which is provided with an upwardly presented shoulder 20 at its lower end. A portion of collar 18 is cut away to provide a pour aperture 21 (FIGS. 7 and 8). A cylindrical inclined opening 22 extends through frame 12 immediately below the lower end of mouth 14. Communication between inclined opening 22 and mouth 14 is provided by aperture 16. Frame 12 is provided at its lower end with a hollow vertical tube 24 which is also in communication with inclined opening 22. A funnel plug 26 is rigidly secured within the lower end of vertical tube 24 and includes a funnel-shaped opening 28 extending therethrough. Vertical tube 24 and funnel plug 26 provide a drop tube for delivering powder to a shell (not shown). Threads 30 are provided on the outer surface of funnel plug 26 for accommodating securing means (not shown) for securing the powder metering device 10 to a mounting bracket.

Resting on top of funnel-like mouth 14 is a circular plate 32 having a plurality of openings 34 therein. A tongue 36 is provided in the peripheral edge of plate 32 and is bent downwardly where it fits within pour aperture 21 of collar 18. Slidably fitted over collar 18 is a vertically disposed cylindrical reservoir 38 having an opening 40 cut out of its lower edge. Reservoir 38 is adapted to rotate as it rests on shoulder 20 so that opening 40 can be moved into or out of alignment with pour aperture 21. During the powder metering operation opening 40 is turned so that it is out of alignment with pour aperture 21. When the metering operation is completed opening 40 is aligned with pour aperture 21 and the powder flows out of reservoir 38. Plate 32 supports a major portion of the weight of the powder in reservoir 38 and lets the powder sift through openings 34 into mouth 14. Without plate 32 the fluid pressure created by the powder above mouth 14 would vary with the depth of the powder. Plate 32 minimizes the variance of the powder's fluid-like pressure within mouth 14.

A cylindrical insert tube 42 is rigidly mounted within inclined opening 22. Tube 42 forms an inclined bore or channel 44 which extends through frame 12. Referring to FIG. 3 the left end of tube 42 forms a helical surface 46 which terminates in a shoulder 48. Adjacent the left end of tube 42 is a downwardly presented outlet opening 50. When insert tube 42 is within inclined opening 22, outlet opening 50 includes a vertically disposed forward margin 52 and a rear margin 54 which is disposed in a plane perpendicular to the longitudinal axis of inclined channel 44. Adjacent the right end of insert tube 42 is an upwardly presented inlet opening 56. The interior surface of inlet opening 56 is provided with a V-shaped groove 58.

The apex of groove 58 defines a line 59 which extends between a first point 60 and a second point 62. First point 60 is positioned radially outwardly from inclined channel 44. Line 59 commences at first point 60 and from that point extends radially inwardly, axially, and circumferentially with respect to the cylindrical axis of inclined channel 44.

Figure 2:
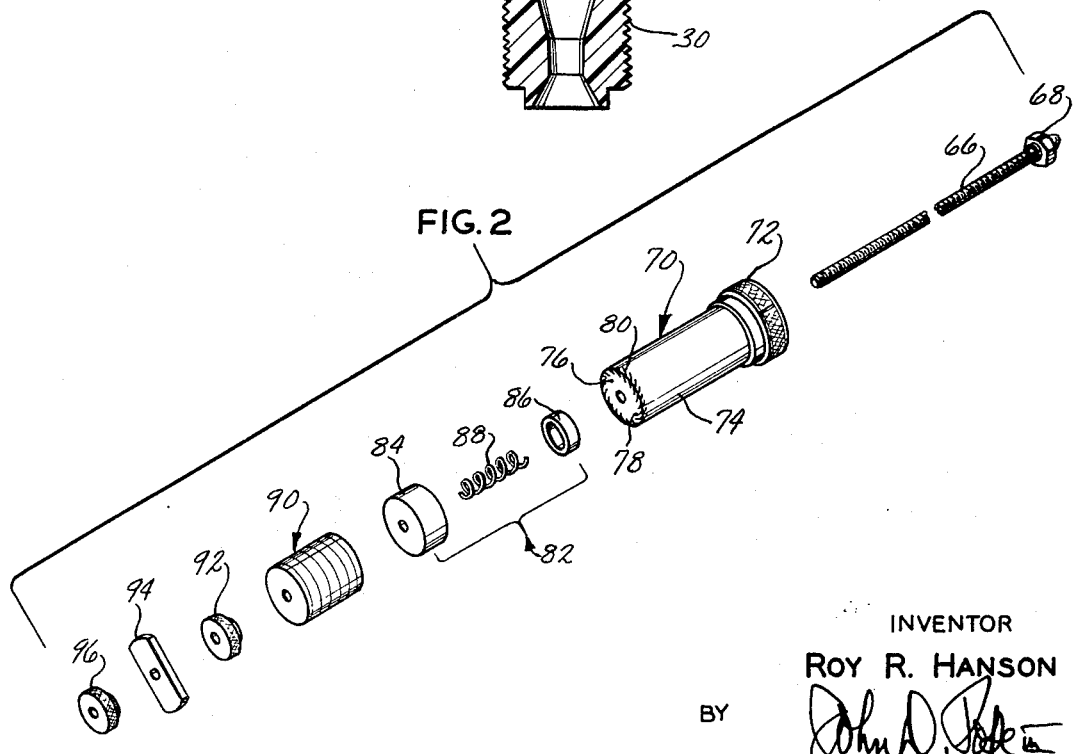
FIG. 2 is an exploded perspective view of the slide used in the powder metering device.

Slidably mounted within inclined channel 44 is a slide 64. Slide 64 includes an elongated threaded rod 66. Referring to FIG. 2, a nut 68 is threaded over the right end of rod 66. A first spool 70 is threadably mounted on rod 66 and includes a head 72 and a cylindrical shank 74. Shank 74 terminates in an axially presented front face 76. An array of notches 78 is formed in front face 76 around its peripheral margin. Each notch 78 extends radially inwardly from the outer peripheral edge of face 76 and is canted with respect to a line tangent to the peripheral edge at the point where each notch 78 commences. A second array of notches 80 is formed in the outer cylindrical surface of shank 74. Notches 80 commence at the extreme left end of shank 74 and extend axially therefrom. Notches 80 are canted with respect to the direction of the longitudinal axis of shank 74. The length of notches 78, 80, may vary, but the preferred length is approximately one-eighth of an inch.

Slidably mounted on rod 66 and abutting against first spool 70 is a plug 82. Plug 82 includes a major plug member 84 and a minor plug member 86 which is telescopically received within major plug member 84. A spring 88 surrounds rod 66 and is compressed between major and minor plug members 84, 86, so as to bias them apart. A second spool 90 is threadably mounted on rod 66 and is positioned so that it presses plug 82 against front face 76 of first spool 70. A lock nut 92 is threaded on rod 66 and is adapted to prevent movement of second spool 90 on rod 66. A stop member 94 is threaded on the extreme left end of rod 66 and is held in place by a lock nut 96. Major plug member 84, second spool 90, and shank 74 of first spool 70 are shaped to conform to the cross-sectional shape of inclined channel 44. These members fit snugly, but slidably, within inclined channel 44. Head 72 of first spool 70 is adapted to abut against the right end (FIG. 1) of insert tube 42, thereby limiting the sliding movement of slide 64 in a downward direction. Stop member 94 is sufficiently large to engage helical surface 46 of insert tube 42, thereby limiting the upward sliding movement of slide 64 in inclined channel 44.

First and second spools 70, 90, are spaced apart a sufficient distance so that minor plug member 86 protrudes outwardly from its telescopic mounting within major plug member 84. Minor plug member 86 is of a diameter which is slightly less than the diameter of inclined channel 44. Thus a doughnut-shaped metering chamber 98 is defined by minor plug member 86, front face 76 of spool 70, the right axial end of major plug member 84, and the interior surface of insert tube 42. The size of metering chamber 98 can be varied by varying the axial distance between first and second spools 70, 90. Plug 82 adjusts to this change in distance by virtue of the telescopic mounting of minor plug member 86 in major plug member 84.

In using powder metering device 10, the operator initially fills reservoir 38 with powder. The powder sifts downwardly into mouth 14 through openings 34 in plate 32. Plate 32 minimizes the fluid-like pressure on the powder in mouth 14 caused by the weight of the powder in reservoir 38. Slide 64 is moved to its extreme left position as shown in FIG. 1. In this position head 72 of first spool 70 abuts against the right end of insert tube 42. Front face 76 of first spool 70 is flush with rear margin 54 of outlet opening 50 in insert tube 42. Second spool 90 protrudes from the left end of inclined channel 44.

Extending around the outer surface of second spool 90 are a plurality of circumferentially extending indicia 100 and extending axially along the outer surface thereof is a hairline 102. By rotating second spool 90 on rod 66 the operator can adjust the size of metering chamber 98 so that it will measure the desired amount of powder. The position of indicia 100 with respect to helical surface 46 provides a reference for determining the axial position of spool 90 on rod 66. The relative positions of hairline 102 and shoulder 48 of insert tube 42 indicate the rotational position of second spool 90. Thus, once the operator has established the proper size for metering chamber 98, he can note the position of indicia 100 and hairline 102 for future use. If the size of metering chamber 98 is subsequently changed, he can return it to its original size by merely returning indicia 100 and hairline 102 to their original noted positions. This micrometer type of adjustment insures a maximum degree of accuracy in adjusting the size of metering chamber 98.

For measuring larger amounts of powder, plug 82 can be removed so that metering chamber 98 is defined between first and second spools 70, 90. In this case rod 66 forms the doughnut hole of doughnut-shaped metering chamber 98. This arrangement is not desirable for measuring small amounts of powder however, because the small inner radius of metering chamber 98 necessitates positioning spools 70, 90, so close together that there is not enough room for the powder to fall into metering chamber 98. Thus plug 82 is inserted for measuring small amounts of powder. It increases the interior radius, and consequently the axial length, for any given volume of metering chamber 98.

After adjusting the size of metering chamber 98, the operator slides slide 64 to the right (FIG. 1) until stop member 94 abuts against helical surface 46 of insert tube 42. Stop member 94 is then rotated on rod 66 so that it is positioned to stop the sliding movement of slide 64 at a point wherein metering chamber 98 is disposed directly below inlet opening 56 of insert tube 42. The powder within mouth 14 then falls downwardly through inlet opening 56 into metering chamber 98. Because inclined channel 44 slants downwardly, gravity causes the powder to fall into metering chamber 98 and completely fill it along its entire axial length. After metering chamber 98 is filled, the operator gently slides slide 64 to the left. As front face 76 of first spool 70 approaches the left margin of inlet opening 56, it is rotated slowly in a clockwise direction. This rotation causes notches 78 on front face 76 and notches 80 on cylindrical shank 74 to engage the granules of powder and draw them inwardly into metering chamber 98. Referring to FIG. 6, the rotation of slide 64 causes a rod-shaped powder granule 104 to be drawn into V-shaped groove 58 of inlet opening 56. As the rotating first spool 70 progresses past inlet opening 56, granule 104 is drawn into metering chamber 98 without being sheared off. Notches 78, 80, of first spool 70 are equally as effective to prevent shearing off of spherical and scale-shaped powder particles. In previous slide metering devices it was necessary for the slide to be constructed of a very hard material in order to prevent abrasion and scratching of the slide by the powder particles. The cooperation of spool 70 with V-shaped groove 58 of inlet opening 56 minimizes any abrasion and shearing of particles and, therefore, eliminates the need for constructing slide 64 of a hard tough material such as steel. Softer materials such as plastic can be used with a minimum of wear resulting.

After metering chamber 98 is filled it is moved to the left where it is aligned above outlet opening 50. The powder falls out of metering chamber 98 through the drop tube provided by funnel-shaped opening 28 into an awaiting shell (not shown). The slide is then returned to its extreme right position wherein metering chamber 98 is again filled with powder and the cycle is repeated until the desired number of shells have been filled. Upon completion of the use of metering device 10 the operator rotates reservoir 38 until opening 40 is aligned with pour aperture 21, whereupon the powder pours out of reservoir 38.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A powder metering device comprising a powder reservoir, a drop tube positioned below said powder reservoir; an elongated cylindrical channel between said reservoir and said drop tube; inlet and outlet openings in said channel for providing communication from said channel into said reservoir and said drop tube respectively; said inlet and outlet openings being axially spaced within said channel; and a slide mounted within said channel for axial movement therein; said slide being cylindrical and having a reduced diameter portion intermediate its length; said reduced diameter portion forming a metering chamber when said slide is confined within said channel, and wherein said slide is rotatable within said channel and includes an axially presented face forming the trailing edge of said metering chamber when said metering chamber moves from said inlet opening toward said outlet opening; a plurality of notches being formed in said face; each of said notches extending radially inwardly from a point at the outer peripheral edge of said face and being canted with respect to a line tangent to said peripheral edge at said point.

2. A powder metering device comprising a powder reservoir, a drop tube positioned below said powder reservoir; an elongated cylindrical channel between said reservoir and said drop tube; inlet and outlet openings in said channel for providing communication from said channel into said reservoir and said drop tube respectively; said inlet and outlet openings being axially spaced within said channel; and wherein a portion of the interior surface of said inlet opening forms a V-shaped groove, the apex of said groove defining a line which extends between first and second points; said first point being radially outward from said channel; said line commencing at said first point and progressing from said first point radially inwardly, axially and circumferentially with respect to the cylindrical axis of said channel; and a slide mounted within said channel for axial movement therein; said slide being cylindrical and having a reduced diameter portion intermediate its length; said reduced diameter portion forming a metering chamber when said slide is confined within said channel.

3. A powder metering device comprising a powder reservoir, said reservoir being a vertically disposed cylinder including a plate having a plurality of apertures therein being fitted across the lower end of said cylinder, a frame supporting said cylinder; said cylinder being rotatably mounted thereon; the lower end of said cylinder and said frame each having an aperture therein, said apertures being adapted to be aligned by rotation of said cylinder with respect to said frame, whereupon alignment of said two apertures permits powder to flow out of said reservoir, a drop tube positioned below said powder reservoir; an elongated cylindrical channel between said reservoir and said drop tube; inlet and outlet openings in said channel for providing communication from said channel into said reservoir and said drop tube respectively; said inlet and outlet openings being axially spaced within said channel; and a slide mounted within said channel for axial movement therein; said slide being cylindrical and having a reduced diameter portion intermediate its length; said reduced diameter portion forming a metering chamber when said slide is confined within said channel.

4. A powder metering device comprising a powder reservoir, a drop tube positioned below said powder reservoir; and elongated cylindrical channel between said reservoir and said drop tube; inlet and outlet openings in said channel for providing communication from said channel into said reservoir and said drop tube respectively; said inlet and outlet openings being axially spaced within said channel; and a slide mounted within said channel for axial movement therein; said slide being cylindrical and having a reduced diameter portion intermediate its length; said reduced diameter portion forming a metering chamber when said slide is confined within said channel, and wherein said slide is rotatable in said channel and includes a cylindrical shank terminating in an axially presented front face; said front face forming the trailing edge of said metering chamber when said metering chamber is moved from said inlet opening towards said outlet opening; a plurality of notches being provided in said front face around its peripheral edge; a plurality of notches also being provided in the outer cylindrical surface of said shank and extending axially along it from a point adjacent said front face.

5. A powder metering device comprising a powder reservoir; a drop tube below said powder reservoir; an elongated channel between said reservoir and said drop tube; inlet and outlet openings in said channel for providing communication from said channel into said reservoir and said drop tube respectively; a slide having a metering chamber therein and being movable from a first position wherein said metering chamber is in communication with said inlet opening to a second position wherein said metering chamber is in communication with said outlet opening; said slide including two spaced apart slide members mounted on an elongated rod; said metering chamber being formed by the space between said slide members; at least one of said slide members being selectively movable to a plurality of positions on said rod so as to permit adjustment of the size of said metering chamber, and wherein a plug is mounted on said rod between said two slide members; said plug including a portion having an outer radial surface spaced inwardly from the inner surface of said channel, said portion of said plug being a first plug member; said first plug member being telescopically received within a second plug member; a spring being positioned between said first and second plug members for yieldably urging them axially apart.

6. A powder metering device comprising a powder reservoir including a supply port, powder-receiving means spaced below said powder reservoir, and dispensing means intermediate said powder reservoir and said powder-receiving means for distributing a measured amount of powder from said powder reservoir to said powder-receiving means, said dispensing means including elongated slide means displaceably mounted transversely of said reservoir and said powder-receiving means for displaceable movement between first and second limit positions, said slide means including a measuring chamber having a capacity corresponding to the measured amount of powder from said supply port, said measuring chamber being in alignment with said supply port in one of said limit positions and in communication with said powder-receiving means in the other said limit position, said slide means including detachable volumetric insert means for limiting the powder capacity of said measuring chamber, insert means of one size being interchangeable with insert means of another size.

7. A powder metering device as claimed in claim 6 wherein said insert means comprises expandable plug means detachably mounted on said slide means.

8. A powder metering device as claimed in claim 6 wherein said insert means is of variable volume and includes means for varying the volume thereof.

9. A powder metering device as claimed in claim 8 wherein said volume varying means include at least two engageable telescoping members having a spring disposed therebetween for urging said members into a telescopically expanded condition.

10. A powder metering device as claimed in claim 6 wherein the direction of displacement of said slide means is inclined with respect to a vertical line joining said powder reservoir and said powder-receiving means.

11. A powder metering device as claimed in claim 6 wherein said slide means are displaceably mounted in an elongated collar.

12. A powder metering device as claimed in claim 11 wherein said collar includes an inlet opening in alignment with said supply port, said measuring chamber being alignable with said inlet opening for receiving said measured amount of powder from said powder reservoir.

13. A powder metering device as claimed in claim 12 further including means for aligning said measuring chamber with said inlet opening.

14. A powder metering device as claimed in claim 13 wherein said aligning means includes a stop member component and a stop member engaging means component, one of said components being on said slide member, the other said component being on said collar.

15. A powder metering device as claimed in claim 8 wherein said slide is adjustable to permit volume variation of said insert means.

16. A powder metering device as claimed in claim 15 further including indicia means on said slide means for indicating the volumetric capacity of said measuring chamber.

17. A powder metering device as claimed in claim 16 further including a fixed reference indicator and wherein said indicia means include hairlines extending longitudinally of said slide and hairlines extending transversely thereof, such that the relative position of said hairlines with respect to said fixed reference indicator corresponds to an adjustment of said slide thereby indicating the volumetric capacity of said measuring chamber.

18. A powder metering device comprising a powder reservoir including a supply port, powder-receiving means spaced below said powder reservoir, and dispensing means intermediate said powder reservoir and said powder-receiving means for distributing powder from said powder reservoir to said powder-receiving means, said dispensing means including elongated slide means displaceably and rotatably mounted transversely of said reservoir and said powder-receiving means, said slide means including a measuring chamber with a transverse surface portion arranged to move rotationally past said supply port during displacement of said slide means, said surface portion including a plurality of notches formed around the periphery thereof for drawing powder from said supply port into said measuring chamber during movement of said measuring chamber past said supply port.

19. A powder metering device as claimed in claim 18 wherein said notches extend radially inwardly from a point at the periphery of said transverse surface and being canted with respect to a line tangent to said periphery at said point.

20. A powder metering device as claimed in claim 19 wherein said notches extend from said front face axially along the outer surface of said slide.

21. A powder metering device comprising a frame, a powder reservoir mounted to said frame, powder-receiving means spaced below said powder reservoir, and dispensing means intermediate said powder reservoir and said powder-receiving means for distributing powder from said powder reservoir to said powder-receiving means, said dispensing means including an elongated slide channel extending transversely of said reservoir and said powder-receiving means, and having an inlet opening in communication with said powder reservoir, said dispensing means further including a slide member in said slide channel for displaceable movement therein, said slide member including a powder measuring chamber alignable with said inlet opening, said slide channel including an internal recessed portion extending from said inlet opening axially along said channel for providing clearance for powder falling through said inlet opening into said measuring chamber during movement of said measuring chamber past said inlet opening.

22. A powder metering device comprising a power reservoir including a supply port, powder-receiving means spaced below said powder reservoir, and dispensing means intermediate said powder reservoir and said powder-receiving means for distributing a measured amount of powder from said powder reservoir to said powder-receiving means, said dispensing means including elongated slide means displaceably mounted transversely of said reservoir and said powder-receiving means for displaceable movement between first and second limit positions, said slide means including a measuring chamber having a capacity corresponding to the measured amount of powder from said supply port, said measuring chamber being in alignment with said supply port in one of said limit positions and in communication with said powder-receiving means in the other said limit position, said slide means including detachable volumetric insert means for limiting the powder capacity of said measuring chamber, said slide means being displaceably mounted in an elongated collar, said collar including an inlet opening in alignment with said supply port, said measuring chamber being alignable with said inlet opening for receiving said measured amount of powder from said powder reservoir, said powder metering device further including a means for aligning said measuring chamber with said inlet opening, said aligning means including a stop member component and a stop member engaging means component, one of said components being on said slide member, the other said component being on said collar and wherein said stop member component includes a stem piece at one end portion of said slide and said engaging means component includes a helical surface formed at a corresponding end portion of said collar, said helical surface terminating at a shoulder portion of said collar, alignment of said measuring chamber and said inlet opening occurring when said stem piece engages said helical surface and abuts said shoulder.

23. A powder metering device as claimed in claim 6 including pressure-compensating means provided over said supply port to support the powder in said reservoir and to permit entry of powder from said reservoir to said supply port substantially free of powder pressures within said reservoir.

24. A powder metering device as claimed in claim 23 wherein said pressure-compensating means include a plate having at least one opening therein, said plate being spaced from said supply port such that powder from said reservoir enters said supply port through said opening.

25. A powder metering device as claimed in claim 24 wherein said plate is mounted across said reservoir and the area of said opening is a minor portion of the area circumscribed by said plate.

26. A powder metering device as claimed in claim 22 including pressure-compensating means provided over said supply port to support the powder in said reservoir and to permit entry of powder from said reservoir to said supply port substantially free of powder pressures within said reservoir.

27. A powder metering device as claimed in claim 26 wherein said pressure-compensating means include a plate having at least one opening therein, said plate being spaced from said supply port such that powder from said reservoir enters said supply port through said opening.

28. A powder metering device as claimed in claim 27 wherein said plate is mounted across said reservoir and the area of said opening is a minor portion of the area circumscribed by said plate.

* * * * *